(12) United States Patent
Brand et al.

(10) Patent No.: US 8,554,343 B2
(45) Date of Patent: Oct. 8, 2013

(54) METHOD FOR SOLVING CONTROL PROBLEMS

(75) Inventors: Matthew Brand, Newton, MA (US);
Vijay Shilpiekandula, Belmont, MA (US); Scott A Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 160 days.

(21) Appl. No.: 12/962,744

(22) Filed: Dec. 8, 2010

(65) Prior Publication Data

US 2012/0150324 A1 Jun. 14, 2012

(51) Int. Cl.
*G05B 13/02* (2006.01)

(52) U.S. Cl.
USPC .............................. 700/31; 700/28; 318/516

(58) Field of Classification Search
USPC ...................... 700/28, 31; 318/561
See application file for complete search history.

(56) References Cited

U.S. PATENT DOCUMENTS

| | | | |
|---|---|---|---|
| 5,519,605 A | 5/1996 | Cawlfield | |
| 7,197,485 B2 * | 3/2007 | Fuller | 706/14 |
| 7,376,472 B2 * | 5/2008 | Wojsznis et al. | 700/29 |
| 7,418,372 B2 | 8/2008 | Nishira et al. | |
| 7,826,909 B2 | 11/2010 | Attarwala | |
| 2005/0193739 A1 | 9/2005 | Brunell | |
| 2007/0225835 A1 * | 9/2007 | Zhu | 700/44 |
| 2009/0254202 A1 * | 10/2009 | Pekar et al. | 700/29 |
| 2011/0060424 A1 * | 3/2011 | Havlena | 700/29 |
| 2011/0301723 A1 * | 12/2011 | Pekar et al. | 700/29 |

FOREIGN PATENT DOCUMENTS

| | | |
|---|---|---|
| JP | 6-257702 A | 9/1994 |
| JP | 2006-072747 A | 3/2006 |
| JP | 2009-064090 A | 3/2009 |
| JP | 2002-132304 A | 5/2010 |

\* cited by examiner

*Primary Examiner* — Mohammad Ali
*Assistant Examiner* — Sheela S Rao
(74) *Attorney, Agent, or Firm* — Dirk Brinkman; Gene Vinokur

(57) ABSTRACT

A method solves a quadratic programming (QP) problem in real-time implementations of model predictive control for automation applications. The method can be implemented for fine-grained parallel solutions. Due to the extreme simplicity of the method, even serial implementations offer considerable speed advantages. The method solves the problem by formulating, over a predetermined time interval, an optimization problem with a quadratic cost function, and linear state and control constraints as a quadratic program for the application. Then, the quadratic program is solved by applying a parallel quadratic programming update law starting from a positive initial estimate to obtain control actions for the application.

18 Claims, 1 Drawing Sheet

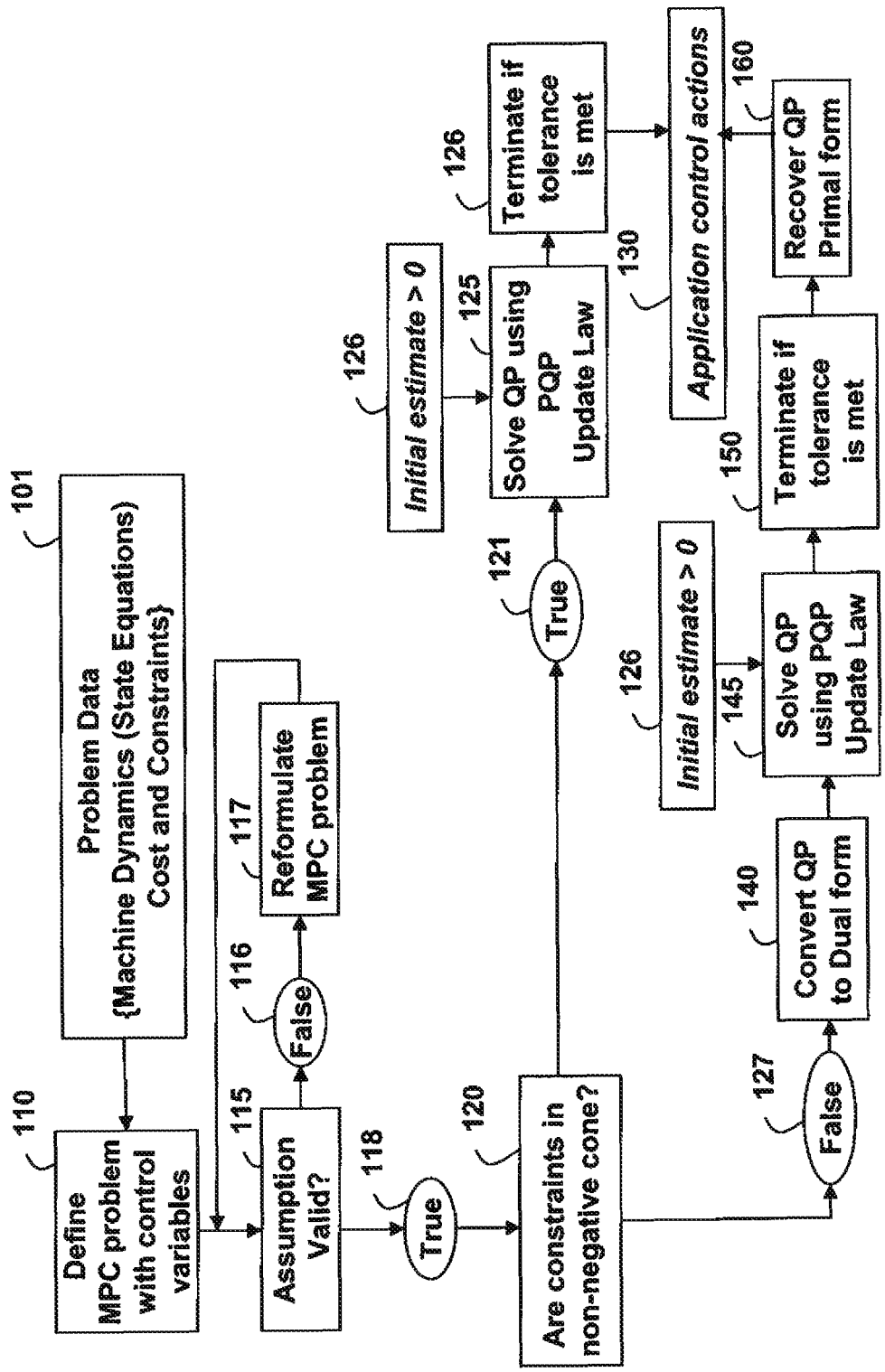

METHOD FOR SOLVING CONTROL PROBLEMS

FIELD OF THE INVENTION

This invention is related generally to factory automation, and more particularly to model predictive control for optimizing control commands for machine tools.

BACKGROUND OF THE INVENTION

Model predictive control (MPC) is an optimization-based control strategy, which has been successfully applied in a wide range of applications, such as chemical process control, servo motion control, automotive cruise control, and multi-agent control in transportation networks, see e.g., U.S. Pat. Nos. 7,826,909, "Dynamic model predictive control," 7,418,372, "Model predictive control apparatus," and 5,519,605, "Model predictive control apparatus and method."

An MPC formulation is as follows. At each sampling time instant, an optimization problem is solved to minimize user-specified costs over a finite horizon in forward time, and a sequence of controls is obtained. This optimization is performed online, also referred to as in real-time. From the sequence of controls in forward time, only the first control is applied and the system is driven to the next sample time, when the above procedure is repeated. The cost function at each sample time can have various structures, an example being a quadratic form, which makes the optimization problem a quadratic programming (QP) problem.

One of the main drawbacks of MPC is that it requires long computation times to solve the optimization problem at each sampling time instant. Therefore, it is usually restricted to systems with slow dynamics and large sampling time intervals, such as chemical processes.

More recently, MPC has been used in control applications with short sampling time intervals, by adapting fast optimization methods. In particular, fast QP methods have been proposed for the MPC problem to enable fast solution of the QP problem posed at each sampling time. For instance, interior point methods have are known that are specifically adapted to take advantage of the special structure of the QP problem in the MPC setting, thus achieving significant reduction in processing time.

An active set method assigns priorities to constraints associated with a more "recent" future. Gradient methods for the MPC of linear time-invariant (LTI) systems with input constraints are also known.

Although the above methods can reduce processing time, many of the methods are heuristics without any guarantees on convergence to a global minimum. In addition, parallel implementation of those methods, when possible, depends on specific problem structures and input data.

SUMMARY OF THE INVENTION

The embodiments of the invention provide a method for parallel implementations of quadratic programming (QP) problems in model predictive control (MPC). The invention used a programming update rule that is amenable to parallelization, hence the name parallel quadratic programming (PQP). Such parallelization can be accomplished at high performance levels, for e.g. as fine-grain parallelization and other advanced forms of parallelization known to those skilled in the art.

The invention uses a multiplicative fixpoint that is essentially a Karush-Kuhn-Tucker (KKT) first-order optimality condition expressed as a ratio. Decision variables are rescaled, rather than incremented as in prior art gradient-based methods. Similar multiplicative fixpoint methods have been used in machine learning, tomography, image processing, and estimation, however those methods rely on some combination of strictly nonnegative coefficients, positive definiteness, or favorable initialization for convergence, if convergence is provable at all.

PQP is provably convergent without the restrictions that exist in the prior art. PQP is also related to matrix-splitting methods for linear complementarily problems for solving saddle-point problems. Unlike those methods, the PQP update according to the invention is given in closed form and can be determined independently for each variable.

PQP used in this invention is completely parallelizable for any problem data structure, and can readily exploit the full parallelism of multiprocessor machines, including multi-core, single-instruction/multiple data (SIMD) and graphic processing units (GPU). Due to its extreme simplicity—two matrix-vector products and a scalar divide, the PQP update also offers considerable speed advantages even when implemented on serial computers.

BRIEF DESCRIPTION OF THE DRAWINGS

FIG. 1 is a flow diagram of a method for solving an optimization-based control problem according to embodiments of the invention.

DETAILED DESCRIPTION OF THE PREFERRED EMBODIMENT

FIG. 1 shows a method for solving an optimization-based control problem according to embodiments of the invention.

Input 101 to the method includes control parameters and variables, dynamic state equations, costs, and constraints. The parameters can include machine parameters such as masses, lengths and material parameters. The constraints can include maximum velocity, range of travel, and maximum torque. It is understood that the input can be any arbitrary parameters and constraints found in typical automation applications, including processing plants, machine tools, vehicles etc., as used herein "application,"

A model predictive control (MPC) problem is defined 110 for the application using dynamic models and the input. As known by those of ordinary skill in the art, the model can be obtained from physics-based models or black-box models.

The MPC problem is an optimization problem solved for each finite time interval of a set of N samples. A cost function is predetermined or user defined for the specific application. The constraints are also dictated by the application.

As described below, the optimization problem can be set up as quadratic programming (QP) problem in terms of control variables.

The QP problem is tested 115 for validity of an assumption, on positive definiteness of the quadratic term used in the QP. If the assumption is not valid 116, the QP is reformulated 117 until the assumption is valid.

If the assumption is valid 118, there is an additional condition to be tested 120 for the constraints of the problem. If the constraints are in a non-negative cone 121, the QP is solved 125 by using a PQP update law with a positive initial estimate 126 until a termination condition 126 is met. Many choices exist for the termination condition, for example, a tolerance on cost function or on primal variables, or on changes in their values. The control actions obtained from the optimization are then applied 130 to the application, e.g., machine, plant, and the like.

If the constrains are not in the non-negative cone 127, the primal QP is converted 140 to a dual form, and the PQP update law is applied 145 for a positive initial estimate until a termination condition is met 150. The original primal problem is then recovered 160 from the dual form and the corresponding control actions are then applied to the application.

The steps as described above can be performed in a processor connected to memory and input/output interfaces as known in the art. Any conventional processor as known by those skilled in the art can be used. It is also noted that steps can also be implemented in parallel to reduce processing time.

QP Problems

A QP problem can have a form $$\min_y \left\{ F(y) = \frac{1}{2} y^T Q y + y^T h \right\},$$
$$y \geq 0,$$

where y is a vector of optimization variables, T is a transpose operator, Q is a square matrix, and h is a vector, and min is a function that returns a minimum. Q can be a positive definite matrix, or a positive semi-definite matrix as well.

In the preferred embodiment the problem has a form of an update law $$y_i \leftarrow y_i \left[ \frac{h_i^- + (Q^- y)_i}{h_i^+ + (Q^+ y)_i} \right]$$

for the $i^{th}$ element $y_i$ of the dual variable y, starting from an initial estimate y>0. Here, we define $Q^+$=max (Q, 0)+diag(r), $Q^-$=max (−Q, 0)+diag(r); $h^+$=max (h, 0); $h^-$=max (−h, 0), max (a, b) is taken element-wise, diag (a) is a diagonal matrix formed from vector a, and r is a nonnegative vector, and max is a function that returns a maximum.

In an example application for the preferred embodiment, the invention is applied to a time-varying reference tracking problem. Many practical servo applications include solving such a problem. Example applications include precisely guiding a laser beam, such as required in eye surgery, or machine tools used for precision cutting of metal, plastic of other material substrates.

Solving the optimization-based control problem for a dynamic machine, a servo tracking application for a linear time-invariant system has the following state and output equations at any time sample k:

$$x_{k+1} = Ax_k + Bu_k,$$
$$y_k = Cx_k$$

where $x_k$ denotes states, $u_k$ denotes the controls, $y_k$ denotes the measured outputs, and the system matrices A, B, and C are dependent on physical parameters, e.g., dimensions and other specifications, of the application, e.g., machine tool bandwidth, load-capacity and the like.

The problem objective to solve in this embodiment is to minimize within each time interval of the MPC problem:
  (i) the tracking error between the output position and the reference signal; and
  (ii) the control energy, i.e., the energy consumption of the application (machine tool).

The constraints in the problem are selected as:
  (i) the state constraints:
    (a) the output positions are required to be always within a tolerance band, or tube, around the reference; and
    (b) the velocities are bounded; and
  (ii) the control constraints at each sample point must be within actuator saturation limits.

The method solves the QP problem, for a given sample time interval k, by minimizing a cost function defined as follows over a window of size N $$\min_U \left\{ J(U_k, x_k) = \sum_{i=1}^{N-1} [(y_{k+i} - r_{k+i})^T S(y_{k+i} - r_{k+i}) + u_{k+i}^T R u_{k+i}^T] + (x_{k+N} - x_f)^T P(x_{k+N} - x_f) \right\}$$

where $r_{k+1}$ denotes reference trajectory samples to be tracking, S>0 is a user-selected (tunable) weight on the tracking error cost, R>0 is a user-selected (tunable) weight on the control effort cost, and the last term is a terminal cost with a weight P>0 on the deviation of the terminal state in the window from a desired terminal state $x_f$. Note that, in addition to the above terms, quadratic cost terms representing other practical requirements such as power consumption, acceleration, and jerk can also be included.

The above cost function needs to be minimized for time interval k while the following dynamic state equations and state (or output) and control constraints are satisfied:

$$x_{k+i} = Ax_{k+i-1} + Bu_{k+i-1}$$

$$r_{k+i} - \Delta \leq x_{p,k+i} \leq r_{k+i} + \Delta$$

$$v_{min} \leq x_{v,k+i} \leq v_{max}$$

$$u_{min} \leq u_{k+i} \leq u_{max}$$

where Δ represents a specified maximum deviation of the position $x_{p,k+i}$ from the reference trajectory, $v_{min}$, $v_{max}$ represent minimum and maximum values of velocities $x_{v,k+i}$ of the machine, and $u_{min}$, $u_{max}$ represent the minimum and maximum values of control effort $u_{k+i}$ applied by the machine.

The above MPC problem can be converted 140 to a general primal QP problem of the form:

$$\min_{U_k} = \frac{1}{2} U_k^T Q U_k + H^T U_k,$$
$$VU_n \leq W.$$

If the assumption is valid 115, i.e.,

Assumption: Q>0, the parallel quadratic programming update law can be applied to the dual form of the above primal problem. As described for the optimization formulation, note that Q>0 can be selected such that the quadratic cost terms of the cost function represent a tracking error, control effort, energy consumption, power consumption, acceleration, jerk, other quadratic functions of state, outputs, or controls, or their combinations. The H vector contains parameters representing the reference to be tracked. These parameters may be time-varying for a time-varying reference. The constraints may also be time-varying, which will result in time-varying vector W in the constraint inequality.

The above optimization problem can be performed in a receding horizon, i.e. after solving the current window and obtaining a sequence of controls in forward time, only the first control is applied and the system is driven to the next sample time, from which a new window is selected and the above procedure is repeated.

Note that higher a value of the window size N allows one to see "more future" and a better ability to predict. The window size N can be tuned by the user to a desired level based on requirements of computation time for the optimization problem, time constant of the servo system being controlled, and the reference trajectory being tracked.

The primal solution can be recovered from the dual solution, and applied as control actions to the servo application. If the assumption is not valid 116, the MPC problem is reformulated 117 until the assumption is valid.

EFFECT OF THE INVENTION

This invention is applicable to factory automation applications, where one or more machine tools are driven by control commands to perform a desired task, such as a metal cutting operation.

The method can perform a given task within a specified time while allowing the user to adjust machine parameters online for each operation. Hence, parameters of the method can be adjusted for each cutting operation. The parameters target requirements of precision or accuracy of the cut, time taken and energy consumed for the cutting job.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

The invention claimed is:

1. A method for solving a control problem for an application, comprising the steps of:
    formulating, over a predetermined time interval, the control problem with a quadratic cost function, linear state equations and control constraints as a quadratic program for the application; and
    applying, an update law to an optimization variable vector, starting from a positive initial estimate to obtain control actions for the application, wherein the update law is constructed from the quadratic program based on $$y_i \leftarrow y_i \left[ \frac{h_i^- + (Q^- y)_i}{h_i^+ + (Q^+ y)_i} \right],$$

wherein $i^{th}$ element $y_i$ of the optimization variable vector y starting from the positive initial estimate, Q is a square matrix, $Q^+$=max (Q, 0)+diag(r), $Q^-$=max (-Q, 0)+diag(r); $h^+$=max (h, 0); $h^-$=max (-h, 0), diag (r) is a diagonal matrix formed from a nonnegative vector r, max is a function that returns a maximum, wherein the steps are performed in a processor.

2. The method of claim 1, further comprising:
    modifying the control problem until a primal quadratic term is positive before applying the update law.

3. The method of claim 1, wherein all control constraints are in a non-negative cone, and a quadratic term of the quadratic program is ensured to be non-negative before applying the update law.

4. The method of claim 2 wherein the control problem has general state or control constraints or combinations thereof, and the primal quadratic term is formulated in dual form to apply the update law.

5. The method of claim 1, wherein the control constraints are time-varying.

6. The method of claim 1, wherein cost terms of the quadratic cost function are selected as a tracking error, a control effort, energy consumption, power consumption, acceleration, jerk, quadratic functions of state, outputs, or controls, or combinations thereof.

7. The method of claim 6, wherein in weights on the cost terms are adjusted online, and the weights are relatively sized to determine performance tradeoffs.

8. The method of claim 1, wherein a size of the time interval is adjusted based on a level of look-ahead or prediction desired for model predictive control.

9. The method of claim 1, wherein solving the control problem is performed in a receding horizon, with a first control action is solved from optimization of a previous window applied to a next control action.

10. The method of claim 1, wherein the update law is implemented using online or offline methods.

11. The method of claim 1, wherein the control problem is a set-point control problem, wherein a state or output, or functions of state or output are at a commanded level.

12. The method of claim 1, wherein the control problem is a reference-tracking problem, wherein state or output, or functions of state or output, are within a tolerance of a time-varying commanded trajectory.

13. The method of claim 12, wherein the control problem within each time interval minimizes a tracking error, control effort, energy consumption, power consumption, acceleration, jerk, quadratic functions of state, outputs, or controls and combination thereof.

14. The method of claim 13, wherein the control problem within each time interval is solved in a presence of constraints on states and controls, or linear functions of the states and constraints.

15. A method for solving a control problem for an application, comprising the steps of:
    formulating the control problem as a quadratic program including $$\min_y \left\{ F(y) = \frac{1}{2} y^T Q y + y^T h \right\}, \ y \geq 0,$$

where y is an optimization variable vector, T is a transpose operator, Q is a square matrix, h is a vector, and min is a function that returns a minimum; and
    applying iteratively an update law to the optimization variable vector to obtain control actions for the application, wherein the update law includes $$y_i \leftarrow y_i \left[ \frac{h_i^- + (Q^- y)_i}{h_i^+ + (Q^+ y)_i} \right],$$

wherein $i^{th}$ element $y_i$ of the optimization variable vector y starting from a positive initial estimate, $Q^+$=max (Q, 0)+diag (r), $Q^-$=max (-Q, 0)+diag(r); $h^+$=max (h, 0); $h^-$=max (-h, 0), diag (r) is a diagonal matrix formed from a nonnegative vector r, max is a function that returns a maximum, wherein the steps are performed in a processor.

16. A system for solving a control problem including a quadratic cost function of an optimization variable vector, the system comprising a plurality of processors for:
  minimizing the cost function subject to linear constraints to obtain control actions for an application by applying an update law to the optimization variable vector, wherein the update law is multiplicative update law applied in parallel on the plurality of processors.

17. The system of claim 16, wherein the update law is a multiplicative first-order optimality condition expressed as a ratio that independently rescales elements of the optimization variable vector.

18. The system of claim 16, wherein at least two elements of the optimization variable vector are resealed independently by applying the update law in parallel on at least two processors.

* * * * *